(12) United States Patent
Amidon et al.

(10) Patent No.: US 8,280,985 B2
(45) Date of Patent: Oct. 2, 2012

(54) SERVING CONTENT FROM AN OFF-LINE PEER SERVER IN A PHOTOSHARING PEER-TO-PEER NETWORK IN RESPONSE TO A GUEST REQUEST

(75) Inventors: Chris Amidon, Apex, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 76 days.

(21) Appl. No.: 12/728,856

(22) Filed: Mar. 22, 2010

(65) Prior Publication Data
US 2010/0169465 A1 Jul. 1, 2010

Related U.S. Application Data

(63) Continuation of application No. 10/990,560, filed on Nov. 16, 2004, now Pat. No. 7,698,386.

(51) Int. Cl.
*G06F 15/16* (2006.01)
(52) U.S. Cl. .................. 709/219; 709/206; 709/203
(58) Field of Classification Search .......... 709/202–207, 709/217–219, 238–245
See application file for complete search history.

(56) References Cited

U.S. PATENT DOCUMENTS

| | | | |
|---|---|---|---|
| 5,414,455 A | 5/1995 | Hooper et al. | |
| 5,915,252 A | 6/1999 | Misheski et al. | |
| 5,918,013 A | 6/1999 | Mighdoll et al. | |
| 6,073,168 A | 6/2000 | Mighdoll et al. | |
| 6,292,835 B1 | 9/2001 | Huang et al. | |
| 6,330,606 B1 | 12/2001 | Logue et al. | |
| 6,349,336 B1 | 2/2002 | Sit et al. | |
| 6,449,657 B2 | 9/2002 | Stanbach, Jr. et al. | |
| 6,463,508 B1 | 10/2002 | Wolf et al. | |
| 6,487,538 B1 | 11/2002 | Gupta et al. | |

(Continued)

FOREIGN PATENT DOCUMENTS

JP 2003341150 A 12/2003
(Continued)

OTHER PUBLICATIONS

Fielding, R. et al., "Hypertext Transfer Protocol—HTTP/1:1," Jan. 1997, XP002130469, http://www.ietf.org/rfc/rfc2068.txt.

(Continued)

*Primary Examiner* — David Lazaro
(74) *Attorney, Agent, or Firm* — Withrow & Terranova, PLLC

(57) ABSTRACT

A method and system for serving content from a peer server in a photosharing peer-to-peer network is disclosed, wherein the peer server stores a web album and at least one associated digital image. Aspects of the invention include prior to the peer server going off-line, the peer server initiates a synchronization with a proxy server and a guest content server in which the web page a web page descriptor defining the web album is copied from the peer server to the guest content server, and the image associated with the web album is copied from the peer server to the proxy server. In response to a request from a requesting computer to view content stored in the peer computer when the peer server is off-line, the request is fulfilled by forwarding the web page from the guest content server to the requesting computer, and forwarding the image associated with a web page from the proxy server to the requesting computer, thereby successfully serving content from the peer server even when the peer server is off-line.

4 Claims, 8 Drawing Sheets

U.S. PATENT DOCUMENTS

| | | | |
|---|---|---|---|
| 6,490,615 B1 | 12/2002 | Dias et al. | |
| 6,564,218 B1 | 5/2003 | Roth | |
| 6,622,168 B1 | 9/2003 | Datta | |
| 6,631,369 B1 | 10/2003 | Meyerzon et al. | |
| 6,651,141 B2 | 11/2003 | Adrangi | |
| 6,658,463 B1* | 12/2003 | Dillon et al. | 709/219 |
| 6,697,850 B1 | 2/2004 | Saunders | |
| 6,754,699 B2 | 6/2004 | Swildens et al. | |
| 6,757,684 B2 | 6/2004 | Svendsen et al. | |
| 6,757,705 B1 | 6/2004 | Pardikar et al. | |
| 6,859,807 B1 | 2/2005 | Knight et al. | |
| 6,917,965 B2 | 7/2005 | Gupta et al. | |
| 6,925,485 B1 | 8/2005 | Wang et al. | |
| 6,934,735 B1 | 8/2005 | Emens et al. | |
| 6,944,651 B2 | 9/2005 | Onyon et al. | |
| 6,954,752 B2 | 10/2005 | Iyengar | |
| 7,027,513 B2* | 4/2006 | Zhang et al. | 375/240.16 |
| 7,039,784 B1* | 5/2006 | Chen et al. | 711/170 |
| 7,043,644 B2* | 5/2006 | DeBruine | 713/153 |
| 7,092,699 B1 | 8/2006 | Hefter | |
| 7,181,438 B1 | 2/2007 | Szabo | |
| 7,272,645 B2* | 9/2007 | Chang et al. | 709/223 |
| 7,587,446 B1 | 9/2009 | Onyon et al. | |
| 7,719,971 B1* | 5/2010 | Issa | 370/230 |
| 2002/0023143 A1* | 2/2002 | Stephenson et al. | 709/218 |
| 2002/0023230 A1 | 2/2002 | Bolnick et al. | |
| 2002/0046262 A1 | 4/2002 | Heilig et al. | |
| 2002/0062384 A1 | 5/2002 | Tso | |
| 2002/0065879 A1 | 5/2002 | Ambrose et al. | |
| 2002/0078134 A1 | 6/2002 | Stone et al. | |
| 2002/0103998 A1 | 8/2002 | DeBruine | |
| 2002/0107934 A1 | 8/2002 | Lowery et al. | |
| 2002/0133601 A1 | 9/2002 | Kennamer et al. | |
| 2002/0138744 A1 | 9/2002 | Schleicher et al. | |
| 2002/0178261 A1* | 11/2002 | Chang et al. | 709/225 |
| 2003/0005035 A1* | 1/2003 | Rodgers | 709/202 |
| 2003/0009538 A1* | 1/2003 | Shah et al. | 709/219 |
| 2003/0018639 A1 | 1/2003 | Iyengar | |
| 2003/0046586 A1* | 3/2003 | Bheemarasetti et al. | 713/201 |
| 2003/0050863 A1 | 3/2003 | Radwin | |
| 2003/0061272 A1* | 3/2003 | Krishnamurthy et al. | 709/203 |
| 2003/0063770 A1 | 4/2003 | Svendsen et al. | |
| 2003/0063771 A1 | 4/2003 | Morris et al. | |
| 2003/0069968 A1 | 4/2003 | O'Neil et al. | |
| 2003/0084162 A1 | 5/2003 | Johnson et al. | |
| 2003/0105812 A1 | 6/2003 | Flowers, Jr. et al. | |
| 2003/0112823 A1 | 6/2003 | Collins et al. | |
| 2003/0154306 A1 | 8/2003 | Perry | |
| 2003/0191832 A1 | 10/2003 | Satyavolu et al. | |
| 2003/0195940 A1 | 10/2003 | Basu et al. | |
| 2003/0225885 A1 | 12/2003 | Rochberger et al. | |
| 2004/0054860 A1 | 3/2004 | Dixit et al. | |
| 2004/0064512 A1* | 4/2004 | Arora et al. | 709/206 |
| 2004/0064568 A1* | 4/2004 | Arora et al. | 709/202 |
| 2004/0064693 A1* | 4/2004 | Pabla et al. | 713/168 |
| 2004/0070678 A1 | 4/2004 | Toyama et al. | |
| 2004/0088348 A1* | 5/2004 | Yeager et al. | 709/202 |
| 2004/0098447 A1* | 5/2004 | Verbeke et al. | 709/201 |
| 2004/0139172 A1 | 7/2004 | Svendsen et al. | |
| 2004/0139227 A1 | 7/2004 | Takeda | |
| 2004/0148434 A1* | 7/2004 | Matsubara et al. | 709/246 |
| 2004/0162871 A1 | 8/2004 | Pabla et al. | |
| 2004/0215625 A1* | 10/2004 | Svendsen et al. | 707/10 |
| 2005/0066063 A1* | 3/2005 | Grigorovitch et al. | 710/1 |
| 2005/0071496 A1* | 3/2005 | Singal et al. | 709/232 |
| 2005/0086386 A1 | 4/2005 | Shen et al. | |
| 2005/0091160 A1 | 4/2005 | Kitze et al. | |
| 2005/0091220 A1 | 4/2005 | Klemow | |
| 2005/0097085 A1* | 5/2005 | Shen et al. | 707/3 |
| 2005/0114711 A1* | 5/2005 | Hesselink et al. | 713/201 |
| 2005/0114757 A1 | 5/2005 | Sahota et al. | |
| 2005/0138176 A1* | 6/2005 | Singh et al. | 709/226 |
| 2005/0147044 A1 | 7/2005 | Teodosiu et al. | |
| 2005/0160167 A1 | 7/2005 | Cheng et al. | |
| 2005/0193083 A1 | 9/2005 | Han et al. | |
| 2005/0198125 A1 | 9/2005 | Macleod Beck et al. | |
| 2005/0198191 A1 | 9/2005 | Carlson et al. | |
| 2005/0229243 A1* | 10/2005 | Svendsen et al. | 726/12 |
| 2005/0246634 A1 | 11/2005 | Ortwein et al. | |
| 2005/0267973 A1 | 12/2005 | Carlson et al. | |
| 2006/0010225 A1* | 1/2006 | Issa | 709/217 |
| 2006/0064716 A1* | 3/2006 | Sull et al. | 725/37 |
| 2006/0136551 A1 | 6/2006 | Amidon et al. | |
| 2006/0173985 A1 | 8/2006 | Moore | |
| 2006/0242238 A1 | 10/2006 | Issa | |
| 2007/0064121 A1 | 3/2007 | Issa et al. | |
| 2007/0067493 A1 | 3/2007 | Issa | |
| 2007/0073878 A1 | 3/2007 | Issa | |
| 2007/0078993 A1 | 4/2007 | Issa | |
| 2007/0180075 A1 | 8/2007 | Chasman et al. | |
| 2007/0208583 A1 | 9/2007 | Ward | |
| 2007/0271380 A1* | 11/2007 | Chang et al. | 709/225 |
| 2008/0178234 A1* | 7/2008 | Eyal et al. | 725/91 |
| 2010/0169465 A1* | 7/2010 | Amidon et al. | 709/219 |
| 2010/0211677 A1* | 8/2010 | Issa | 709/224 |

FOREIGN PATENT DOCUMENTS

| | | |
|---|---|---|
| WO | 2005099165 A2 | 10/2005 |
| WO | 2006026193 A2 | 3/2006 |
| WO | 2006055535 A2 | 5/2006 |

OTHER PUBLICATIONS

Lerner, Reuven M., "At the Forge Aggregating with Atom," (article), 2004, 7 pages, Linux Journal, vol. 2004, No. 127, 2004.

Lerner, Reuven M., "At the Forge Syndication with RSS," (article), 2004, 9 pages, Linux Journal, vol. 2004, No. 126, 2004.

Lerner, Reuven M., "At the Forge Aggregating Syndication Feeds," (article), 7 pages, 2004, Linux Journal, vol. 2004, No. 128, 2004.

Lerner, Reuven M., "At the Forge Bloglines Web Services, Continued," (article), 2005, 7 pages, Linux Journal, vol. 2005, No. 131, 2005.

Lerner, Reuven M., "At the Forge: Bloglines Web Services," (article), 2005, 6 pages, Linux Journal, vol. 2005, No. 129, 2005.

Parker, Jason, "An Easy Way to Share Digital Photos with Others," ZDNet AnchorDesk Editorial Feature, Jun. 13, 2003, http://reviews-zdnet.com, p. 1.

Raymond, Scott, "Broadcatching with BitTorrent," (article), Dec. 16, 2003, 3 pages, http://web.archive.org/web/20040213093750/http://scottraymond.net/archive/4745.

Lee, Sung-Ju, et al., "An Interactive Video Delivery and Caching System Using Video Summarization," (article), Mar. 2002, pp. 424-435, Computer Communications, vol. 25, No. 4.

No Author, Wikipedia—Broadcatching, (website), obtained Mar. 5, 2008, 3 pages, http://en.wikipedia.org/wiki/Broadcatching.

The Apache Software Foundation, http://www.apache.org/, accessed Jun. 14, 2006.

Squid Web Proxy Cache, http://www.squid-cache.org/, accessed Jun. 14, 2006.

Non-Final Rejection mailed Apr. 3, 2008 issued by the Patent Office during the prosecution of U.S. Appl. No. 10/990,560. 19 pages.

Final Rejection mailed Nov. 12, 2008 issued by the Patent Office during the prosecution of U.S. Appl. No. 10/990,560. 9 pages.

Advisory Action mailed Jan. 23, 2009 issued by the Patent Office during the prosecution of U.S. Appl. No. 10/990,560. 3 pages.

Non-Final Rejection mailed May 27, 2009 issued by the Patent Office during the prosecution of U.S. Appl. No. 10/990,560. 19 pages.

Notice of Allowance mailed Jan. 12, 2010 issued by the Patent Office during the prosecution of U.S. Appl. No. 10/990,560. 13 pages.

Fielding, R., et al., "Hypertext Transfer Protocol—HTTP/1.1," Request for Comments (RFC) 2616, Internet Engineering Task Force (IETF) Network Working Group, Jun. 1999, http://tools.ietf.org/pdf/rfc2616.pdf, 114 pages.

Unknown, "Cache from High Definition: A-Z Guide to Personal Technology", CREDOreference, Houghton Mifflin Company, accessed Jul. 18, 2011, Copyright Date 2006, http://www.credoreference.com/entry/hmhighdef/cache, 2 pages.

* cited by examiner

SERVING CONTENT FROM AN OFF-LINE PEER SERVER IN A PHOTOSHARING PEER-TO-PEER NETWORK IN RESPONSE TO A GUEST REQUEST

CROSS-REFERENCE TO RELATED APPLICATION

The present invention is a continuation of patent application Ser. No. 10/990,560, filed Nov. 16, 2004, entitled "Serving Content From an Off-Line Peer Server in a Photosharing Peer-to-Peer Network in Response to a Guest Request", the disclosure of which is hereby incorporated by reference in its entirety, and which is related to U.S. patent application Ser. No. 10/927,291, filed on Aug. 25, 2004, entitled "Proxy Caching In A Photosharing Peer-to-Peer Network to Improve Guest Image Viewing Performance", assigned to the same assignee of the present application.

FIELD OF THE INVENTION

The present invention relates to sharing digital images over a network, and more particularly to a method and system for improving guest viewing performance of images stored on peer computers in a photosharing peer-to-peer network.

BACKGROUND OF THE INVENTION

Over the past several years, photosharing has become widely accepted by photo enthusiasts. Many websites currently exist that allow users to upload digital images to the site for storage on a server and for viewing by others over the Internet. Oftentimes, images are grouped to form an album web page so that the user can invite others to view the album web page, as opposed to each individual image.

This approach to photosharing, however, presents some disadvantages. In particular, users are required to upload digital images to the site, which can be time consuming, and the site requires extensive storage capacity to store the images of all the users, which can become expensive.

To address these concerns, the assignee of the present invention has developed a web-based peer-to-peer photosharing system in which all workstations and computers (peers) in the network store images locally and act as servers to other users on the network. A central site accessible by all the peers provides additional functionality, such as coordinating the peers, providing search capabilities for the peers, purchase order fulfillment, etc.

FIG. 1 is a block diagram illustrating the web-based peer-to-peer photosharing system. The peer-to-peer photosharing system 20 includes a photosharing P2P network 22, which comprises multiple peer servers 24 running peer node software 26 and web server software 28. The peer node and server software 24 and 26 enable the users of the computers to share images with others in the network 22 through a web browser 30 without having to upload their pictures to a web site. A novel feature of the photosharing P2P network 22 is that it provides a hybrid peer-to-peer architecture for general HTTP/web browser configuration that incorporates a central proxy server 36 to coordinate networking traffic for peers behind firewalls, thus allowing access to peers behind firewalls by other peers and by visiting computers 32 not in the network 22. The proxy server 36 provides supporting services to the peers 24 as well as providing a path through which the visiting computer 32 accesses images from the peer servers 24 via a standard web browser 30. Allowing generic HTTP access to the images hosted on peer servers located behind firewalls becomes increasingly important as virtually all corporations use firewalls, and the use of software firewalls installed on user's home systems is becoming ubiquitous. As used herein, the peer servers 24, proxy server 36 and the visiting computer 32 may comprise any computing device, such as PCs, workstations, mobile phones, and PDAs, with components necessary for executing the appropriate software. Also, in a preferred embodiment, the physical communications network is the Internet, although any type of network could be used.

Each peer 24 stores album web pages and associated images locally in a database. Each album web page is associated with a descriptor that includes information about the album, such as which images are included in the album and who is permitted to see the album. For example, if the album is private, only the owner is allowed to view the album; if the album is "public," then everyone can access the album; and if the album is "restricted," then the album is accessible only to selected users. In this case, the descriptor includes an access list. The descriptor for each album web page is stored in a database (not shown) in the peer 24.

When a peer 24 receives a request (via the proxy server 36) to access an album web page from either another peer 24 or a visiting computer 32, the peer 24 accesses the database to retrieve the descriptor associated with the requested album web page. From the descriptor, the peer 24 determines whether the requester (e.g., peer user or user of the visiting computer) is permitted to access the album and which images are in the album web page. If the access is authorized, the peer 24 returns the album web page, which contains embedded images representing each of the album images.

Upon receipt of the album web page, the requestor's browser 30 interprets the web page and then initiates separate requests for each embedded image therein. When the peer 24 receives the request for the image, it accesses the database again to retrieve the descriptor for the album page in which the requested image resides to ensure: (1) that the requested image is actually in the associated album page; and (2) that the requestor has permission to access the album page and its contents, i.e., images.

One problem with routing images through the proxy server 36 is that it requires extra bandwidth. That is, the image must be moved twice; once from the peer server 24 to the proxy server 36, and then a second time from the proxy server 36 to the visiting computer 32. In addition, the path from the peer server 24 to the proxy server 26 generally has the longest latency because the peer server 24 is typically hosted in a user's home equipped with a cable modem or DSL that has an uplink speed much slower that the downlink speed. Thus, users may experience a significant delay when viewing images that are routed through the proxy server 36 due to the bandwidth limitations between the peer server 24 and the proxy server 36.

In addition, because peer servers 24 may be hosted in a variety of environments and host computers, there may be situations where the network to which the peer server 24 belongs may go off-line or the peer server 24 needs to go offline for maintenance. It is also possible that the peer server 24 is a mobile system, such as a laptop or tablet PC, which goes in and out of network service. All of these issues would cause the peer server 24 to disconnect from the proxy server 26 and stop serving guest requests. In this situation, the requesting guest would fail to receive the requested content from the off-line peer server 24.

Accordingly, there is need for a method and system for reducing the amount of network traffic between the peer server and the proxy server, and for serving content from a peer server regardless of whether the peer server is off-line in order to improve guest image viewing performance. The present invention addresses such a need.

BRIEF SUMMARY OF THE INVENTION

The present invention provides a method and system for serving content from a peer server in a photosharing peer-to-peer network, wherein the peer server stores a web album and at least one associated digital image. Aspects of the invention include prior to the peer server going off-line, the peer server initiates a synchronization process with a proxy server and a guest content server in which a web page descriptor defining the web album is copied from the peer server to the guest content server, and the image associated with the web album is copied from the peer server to the proxy server. In response to a request from a requesting computer to view content stored in the peer computer when the peer server is off-line, the request is fulfilled by forwarding the web page from the guest content server to the requesting computer, and forwarding the image associated with a web page from the proxy server to the requesting computer, thereby successfully serving content from the peer server even when the peer server is off-line.

DETAILED DESCRIPTION OF THE INVENTION

The present invention relates to sharing digital images over a network, and more particularly to a method and system for improving guest image viewing performance. The following description is presented to enable one of ordinary skill in the art to make and use the invention and is provided in the context of a patent application and its requirements. Various modifications to the preferred embodiments and the generic principles and features described herein will be readily apparent to those skilled in the art. For example, although the preferred embodiment is in the context of a peer-to-peer network, the same principles can be applied to a client-server environment where the guest browser communicates directly with the computer system storing the album and images. Thus, the present invention is not intended to be limited to the embodiments shown but is to be accorded the widest scope consistent with the principles and features described herein.

The present invention provides a method and system for improving the viewing performance of a peer-to-peer photosharing network in which peer servers store their user's images and are coupled to at least one photosharing system server, such as a proxy server.

Figure 1:
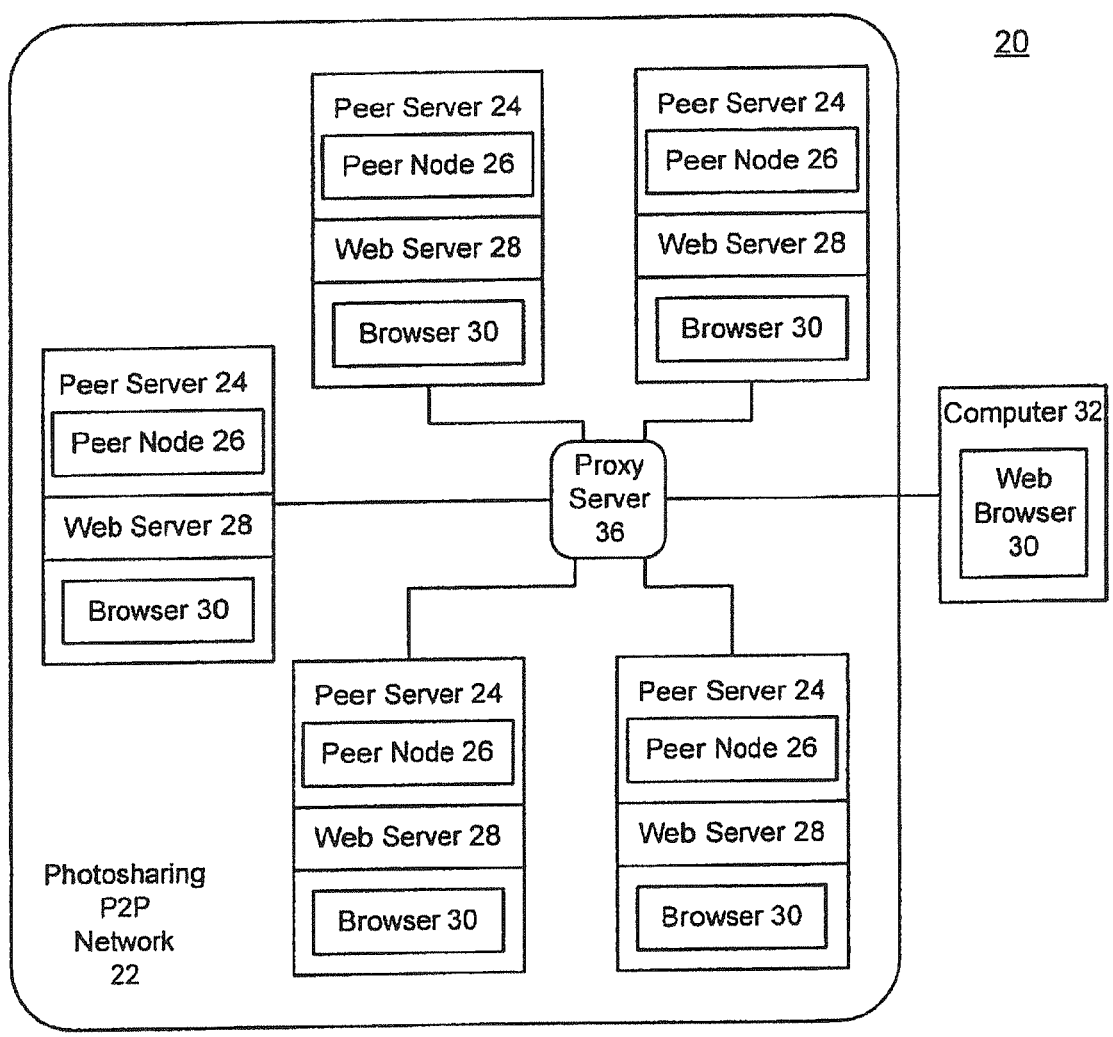
FIG. 1 is a block diagram illustrating an exemplary web-based peer-to-peer environment.
Figure 2:
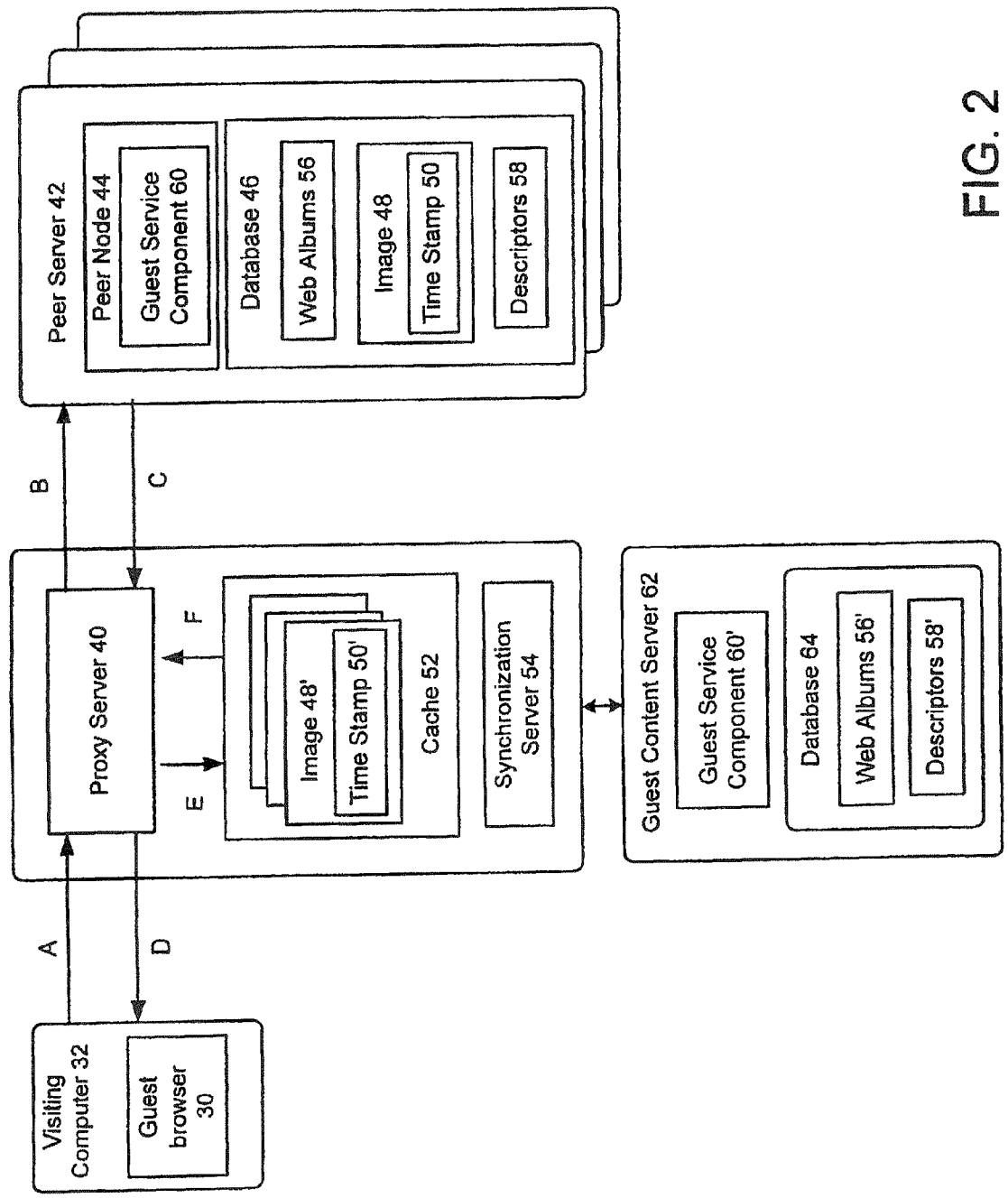
FIG. 2 is a detailed block diagram of an improved photosharing network according to a preferred embodiment of the present invention.

FIG. 2 is a detailed block diagram of an improved photosharing network according to a preferred embodiment of the present invention. Besides the components shown in FIG. 1A, each peer server 42 includes a peer node application 44 that functions according to the preferred embodiment, and a database 46 of web albums 56 and associated digital images 48. The peer node software 42 also includes a guest service component 64 for fulfilling guest request to view content, such as web albums 56 from the peer server 42. The database 46 is typically stored on a hard drive of the hosting computer system, and the images 48 are typically given a timestamp 50 by the host operating system that indicates the date of creation or modification date, as is well-known in the art.

Each web album 56 may include one or more web pages and is associated with a descriptor 58 that includes information about the state of the peer and the web pages comprising the web albums. The descriptor 58 may include an identification of the peer server 42, the number and identity of the images 48 included in the web pages, access privileges for the album and for each image 48 therein, and any metadata that is not stored in the images 48. The access privileges may indicate whether the album 56 is private, public, or restricted. If the album 56 is "private," then only the owner is allowed to view the album; if the album 56 is "public," then everyone can access the album 56; and if the album 56 is "restricted," then the album 56 is accessible only to selected users. In this case, the descriptor 58 includes an access list. The descriptor 58 for each web album 56 is stored in the database 46 in the peer 42. In an alternative embodiment, the database 46 may maintain a descriptor 50 for each web page in the album 56.

The proxy server 40 acts as a proxy for the distributed peer servers 42, which have a pre-established connection to the proxy server 40. The proxy server 40 enables a firewall-protected peer server 42 to enable incoming generic HTTP access by establishing an outbound connection from the firewall-protected peer server 42 with the proxy server 40. Incoming Web traffic for the firewall-protected peer server 42 is then directed to the proxy server 40. The proxy server 40 multiplexes the Web traffic using a proprietary protocol to the peer server 42, thus enabling generic web traffic to flow to the peer server 42 despite the presence of a firewall (not shown). In the case where there are multiple firewall-protected peer servers 42, the proxy server 40 acts as a switchboard to receive and dispatch the incoming HTTP requests to the appropriate peer servers 42. The process for providing Web browsing through a firewall in a peer-to-peer network is described further detail with respect to FIGS. 7 through 9B. As used herein, the peer servers 24, proxy server 40 and the visiting computer 32 may comprise any computing device, such as PCs, workstations, mobile phones, and PDAs, with components necessary for executing the appropriate software. Also, in a preferred embodiment, the physical communications network is the Internet, although any type of network could be used.

According to the preferred embodiment, images 48 stored on the peer server 42 that are requested for viewing by a visiting computer 32, are stored in a cache 52 on the proxy server 40 either before or after the first time the image is requested. In addition, the peer-to-peer photo sharing network is provided with a guest content server 62 that is coupled to both the proxy server 40 and the peer server 42. The purpose of the guest content server 62 is provided with the same guest service component 60 run the peer server 42 so that the guest content server 62 can fulfill requests to view content on the peer server 42 when the peer server 42 is unavailable. Although the preferred embodiment shown in FIG. 2 shows the proxy server 40 and the guest content server 62 as separate computers, the functionality of the proxy server 40 and the guest content server 62 may be implemented on the same computer.

Figure 3:
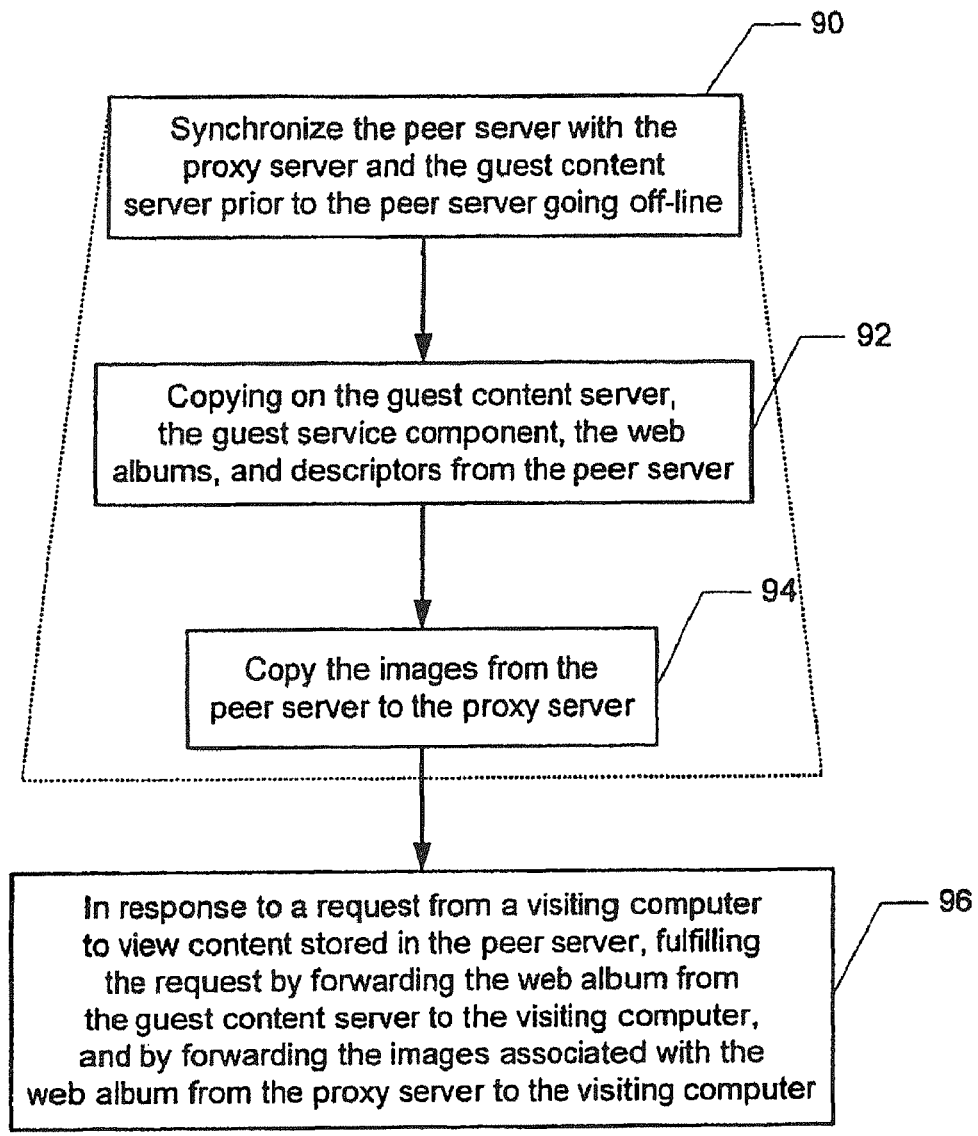
FIG. 3 is a flow diagram illustrating the process for content from a peer server in a photosharing peer-to-peer network in accordance with a preferred embodiment.

FIG. 3 is a flow diagram illustrating the process for content from a peer server in a photosharing peer-to-peer network in accordance with a preferred embodiment. Referring to both FIGS. 2 and 3, the process begins in step 90 by synchronizing the peer server 42 with the proxy server 40 and the guest content server 62 prior to the peer server 42 going off-line. As used herein, the synchronization process includes two steps, steps 92 and 94. In step 92, the guest functionality of the peer server 42 is reproduced on the guest content server 62 by copying on the guest content server 62, the guest service component 60, the web albums 56, and descriptors 58 from the peer server 42. The guest content component 60' may only need to be loaded onto the guest content server 62 once (e.g., during initial configuration of the guest content server 62), while the web albums 56 and descriptors 58 are copied to the guest content server 62 and stored in the database 64 each time the synchronization process is performed. In step 94, the images 48 stored on the peer server 42 are copied to the proxy server 40 and stored in the cache 52.

In response to a request from a visiting computer 32 to view content stored in the peer server 42 via the proxy server 40, the request is fulfilled in step 96 by forwarding the web album 56' from the guest content server 62 to the visiting computer 32, and by forwarding the images 48' associated with the web album 56' from the proxy server 40 to the visiting computer 32, thereby successfully serving content from the peer server 42 even when the peer server 42 is off-line, while also increasing viewing performance.

Figure 4:
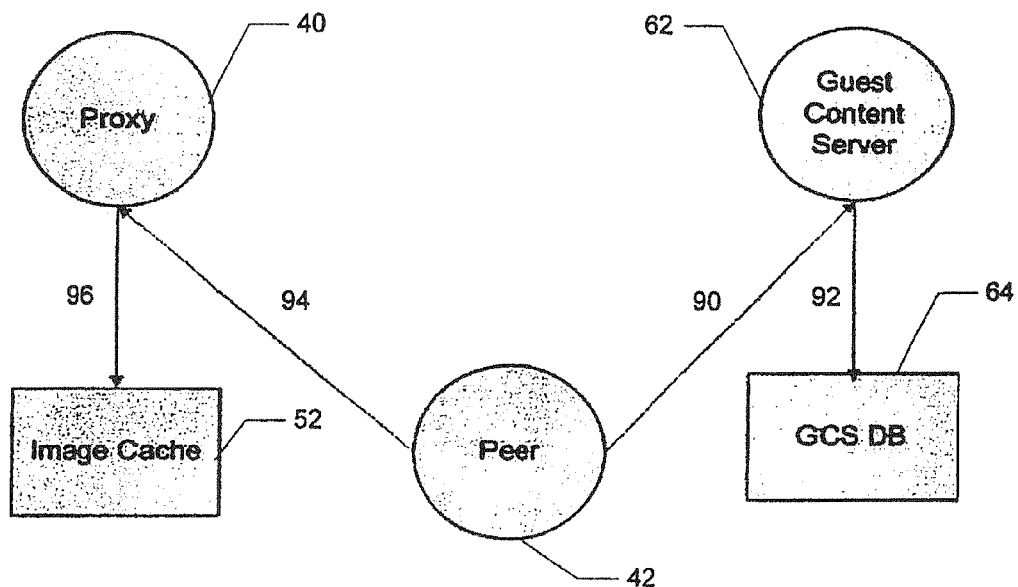
FIG. 4 is a flow diagram illustrating the synchronization process between the peer server, the proxy server 40, and the guest content server.

FIG. 4 is a flow diagram illustrating the synchronization process between the peer server 42, the proxy server 40, and the guest content server 62. The synchronization process is initiated by the peer server 42 prior to the peer server 42 going off-line, and is preferably performed as a background process. The synchronization process begins in step 90 in which the peer server 42 uploads the peer state information to the guest content server 62, including the web album descriptors 58 and the web albums 56. In step 92 the guest content server 62 replicates the peer state in its database 64, resulting in the storage of web albums 56' and web album descriptors 58'. In step 94, the peer server 42 initiates synchronization with the proxy server 40 in which new and/or modified images 48 from the peer server 42 are copied to the proxy server 40. In step 96, the proxy server 40 saves the new and/or modified images 48 in the cache 52. This proxy caching process is described in further detail with respect to FIG. 6.

Figure 5:
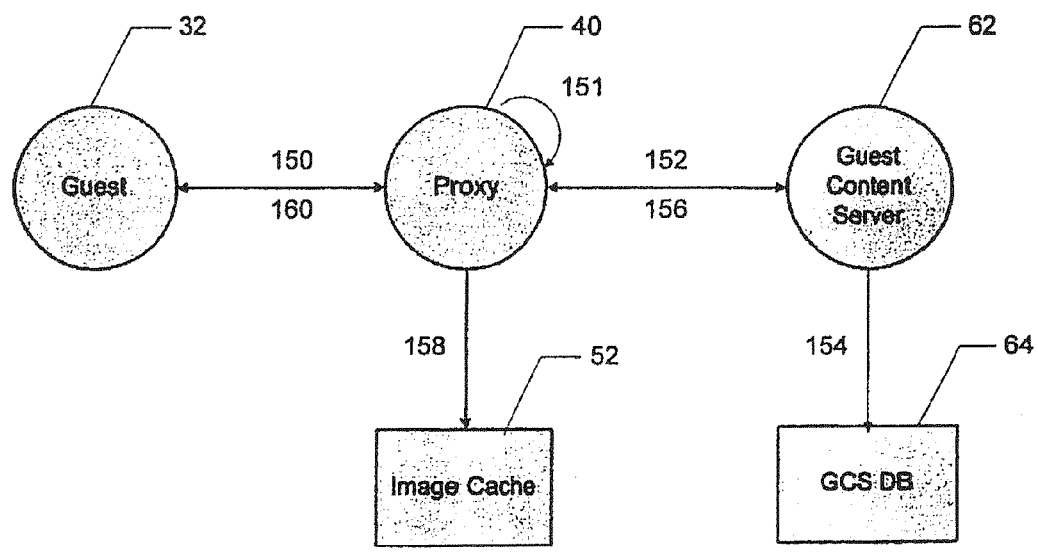
FIG. 5 is a flow diagram illustrating the process for serving content from a peer server when the peer server is off-line online.

FIG. 5 is a flow diagram illustrating the process for serving content from a peer server 42 when the peer server 42 is off-line online. The process begins in step 150 when a visiting computer 32 or guest submits via an industry standard browser 30 a request (URL) to view content on the peer server 42 via the proxy server 40 that the URL for the peer server 42 resolves to. In step 151, rather than automatically forwarding the request to the peer server 42, the proxy server 44 first determines if the peer server 42 is available or not, and whether the peer server 42 is also a subscriber to this off-line service. If the peer server 42 is online, then the proxy server 40 routes the request to the peer server 42 for normal fulfillment through the guest service component 60. If the peer server 42 is off-line, but is not an off-line subscriber, then the proxy server 40 will send the browser 30 of the visiting computer 32 a "peer off-line" message. If the peer server 42 is both off-line and an off-line subscriber, then in step 152 the proxy server 40 routes the request to the guest content server 62 using a proprietary protocol. A proprietary protocol is used to avoid HTTP which would result in a redirect and change the URL in the browser 32 the URL of the guest content server 62.

In step 154, when the guest content server 62 receives the request to access an album 56 from the peer server 42, the guest service component 60' accesses the database 64 to retrieve the descriptor 58' associated with the requested album 56'. From the descriptor 58', the guest service component 60' determines whether the requester (e.g., user of the visiting computer) is permitted to access the album 56' and which images 48' are in the web album pages. If the access is authorized, then the guest service component 60' retrieves from the database 64 captions, order information, and links to embedded images, and constructs the requested web album 56'. In step 156, the guest service component 60' returns to the proxy server 40 the constructed web album.

In step 158, the proxy server 40 receives the constructed web album and pulls out the specified images 48' from the cache 52. In step 160 the proxy server 40 returns the web album 56' and images 40' to the requesting browser 30. In an alternative embodiment, the constructed web album is forwarded to the guest browser 30, and the guest browser 30 makes request to the proxy server 40 for each of the images to be displayed in the web album.

According to a second aspect of the present embodiment, the proxy server 42 ensures that the images 48' in its cache 52 are fresh by sending a request to the peer server 42 to check whether a requested image 48' has been modified since being cached. This is accomplished by comparing the timestamp 50' of the cached image 48' with the timestamp 50 of the image 40 stored on the peer server 42. If the comparison of the timestamps indicates that the image 48 on the peer server 42 has been modified, then the peer server 42 transfers the modified image to the proxy server 42 prior to the proxy server 42 serving the image to the requester.

By caching the images 48' on the proxy server 40, the present invention significantly reduces the need to transfer the image 40 from the peer server 42 to the proxy server 40 along path (C) to satisfy each image request, thereby improving the viewing performance of the network. Although a small amount of data is transferred between the proxy server 40 and the peer server 42 in order to determine if the proxy's cache 52 is still fresh, this traffic is generally only a few bytes, as opposed to the kilobytes or megabytes required to transfer images 40 from the peer server 42 to the proxy server 40 for every image request.

Figure 6:
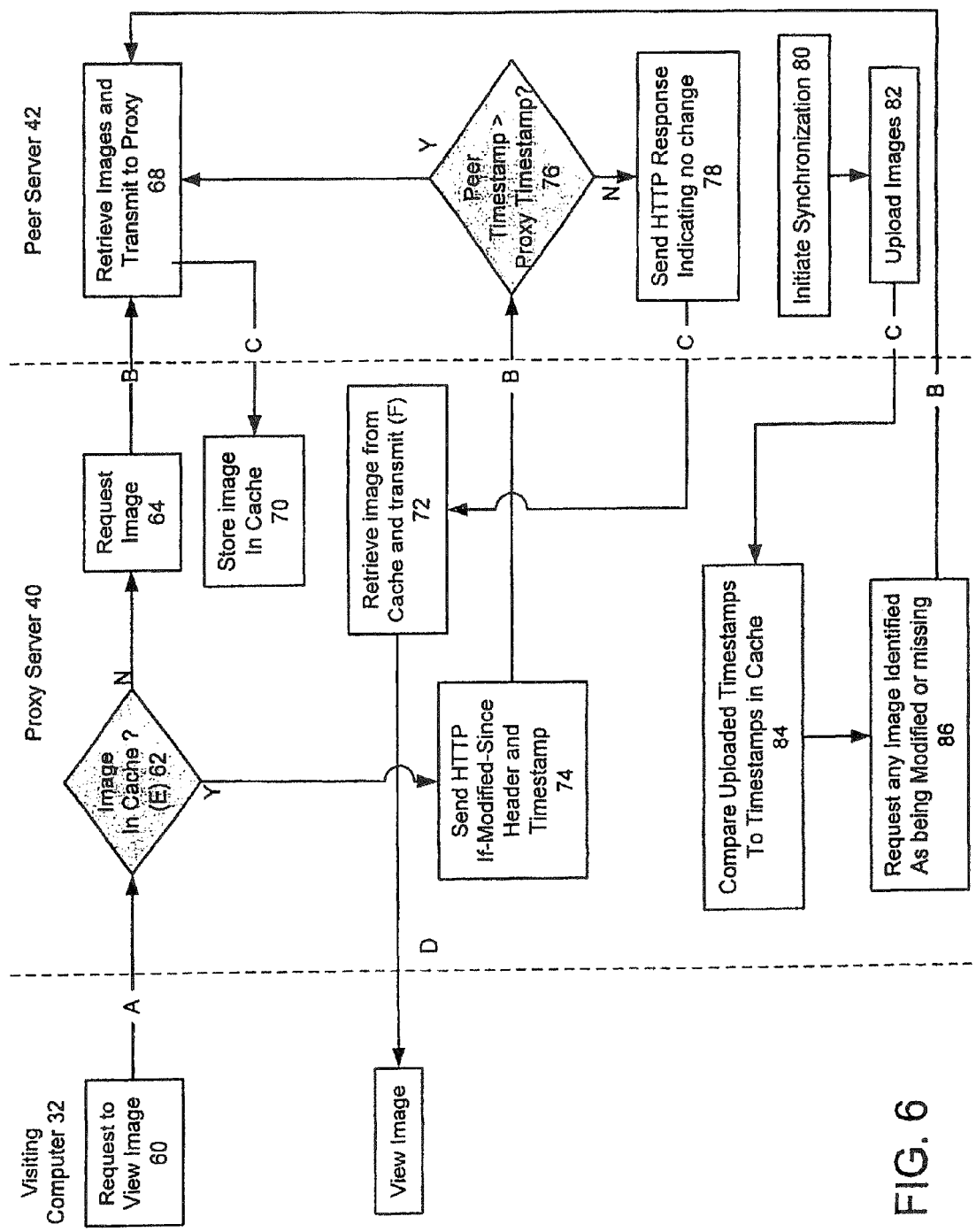
FIG. 6 is a flow diagram illustrating the process for improving guest viewing performance of images stored on peer servers in a photosharing peer-to-peer network.

FIG. 6 is a flow diagram illustrating the process for improving guest viewing performance of images stored on peer servers in a photosharing peer-to-peer network. Referring to both FIGS. 2 and 6, the process begins in step 60 when the visiting computer 32 issues a request to view the image 48 stored in the peer server 42. The request is routed to the proxy server 40 via path (A). In step 62 the proxy server 40 checks if a copy of the image 48' is stored in the cache 52 via path (E).

If the copy of the image 48' is not stored in the cache (a cache miss), which may occur the first time an image is requested, then in step 64 the proxy server 40 sends a request for the image to the peer server 42 hosting the requested image 48 via path (B).

In step 68, the peer server 42 retrieves the image 48 and transmits a copy of the image 48 to the proxy server 40 via path (C). In step 70, the copy of the image 48' is stored in the cache 52. In step 72, the proxy server 40 retrieves the cached image 48' via path (F), and serves it to the requesting visiting computer 32 via path (E). In a preferred embodiment, the proxy server 40 streams the image 48' to the visiting computer 32 while the image 48' is being downloaded from the peer server 42 to further reduce the latency between the time that the request is made and the image is returned.

Referring again to step 62, if the image 48' is present in the cache 52 (a cache hit), the proxy server 40 determines if the cached image 48' is still fresh in step 74 by sending a request to the peer server 42 in the form of a standard HTTP "If-Modified-Since" header with the timestamp 50' of the cached image 48' via path (B). In step 76, the peer node application 44 on the peer server 42 compares the timestamp 50' of the cached image 48' with the timestamp 50 of the image 40 stored on the peer server 42. If the timestamp 50 of the image 48 stored on the peer server 42 is different (i.e., newer) than the timestamp 50' of the cached image 48', then the peer server 42 determines that the image 48 on the peer server 42 has been modified since the image was cached (stale cache). In step 68, the peer server 42 returns a copy of the image 48 as a response via path (C).

If the peer server 42 determines that the image 48 it has stored locally does not having newer timestamp 50 than the timestamp 50' sent by the proxy server 40 in step 76, then in step 78, the peer server 42 sends a 304 HTTP return code to the proxy server 40 as a response indicating that the image has not been modified via path (C). The proxy server 40 then retrieves the image 48' from the cache 52 via path (F) and serves it to the visiting computer 32 via step 72 via path (D).

From time to time, the peer server 42 will become disconnected from the proxy server 40, especially in home environments where users often shut down their PCs when not in use. In this case, the proxy server 40 cannot communicate to the peer server 42 to determine if the images 48' in the cache 52 are still valid. Therefore, the proxy server 40 needs an updated set of the most current images and web page components surrounding those images before the peer server 42 goes off-line.

According to a further aspect of the present invention, this is handled via the synchronization server 54 (FIG. 2) and a synchronization protocol. Referring to both FIGS. 2 and 6, in operation, the user may initiate the synchronization protocol between the peer server 42 and the synchronization server 54 in step 80 prior to disconnecting the peer server 42. In a preferred embodiment, the user interface of the peer node 44 displays a peer synchronization icon or menu item that the user may select. Alternatively, the user may be prompted to perform synchronization, which the user may choose to accept or decline.

Once synchronization is invoked, in step 82 the peer server 42 uploads the timestamps 50 of all the images 48 to the synchronization server 54 via path (C). In step 84, the synchronization server 54 compares the uploaded timestamps 50 to the timestamps 50' to determine if the cached images 48' are current and whether there are any missing images in the cache 52. In step 86, the synchronization server 54 sends a request to the peer server 42 for any images identified as being modified or missing. In step 68, the peer server 42 retrieves and transmits the requested images 48 to the proxy server 40 via path (C).

In a preferred embodiment, synchronization is performed immediately upon request by the user. However, in an alternative embodiment, synchronization may be performed automatically in the background. That is, the proxy server 40 may be synchronized with the peer server 42 at the same time the proxy server 40 is serving images to the visiting computer 32. In this embodiment, synchronization may be performed when the peer server 42 first makes a connection to the proxy server 40. Background synchronization may also be performed when it is detected that the peer server's connection is idle. In either form of background synchronization, by time the user shuts down the peer server 42 after an active session, synchronization with the proxy server 44 may be more than likely complete.

In a preferred embodiment, the synchronization server 54 is a component of the proxy server 40. However, the synchronization server 54 may separate from the proxy server 40 and run on a separate computer.

As can be seen, an image is only transferred from the peer server 42 to the proxy server 40 via path (C) when it is not present in the cache 52, which is typically the case the very first time the image is request, and when the image in the cache 52 needs to be updated. However, other than the first time the image is requested, the image will be present in the cache 52, and the only data passed between the peer server 42 to the proxy server 40 via path (C) is the HTTP return code, which is only a few bytes, rather than megabytes to transfer the image. Due to this decrease in traffic between the peer server 42 to the proxy server 40, image viewing performance of the P2P network for guests is significantly increased.

Figure 7:
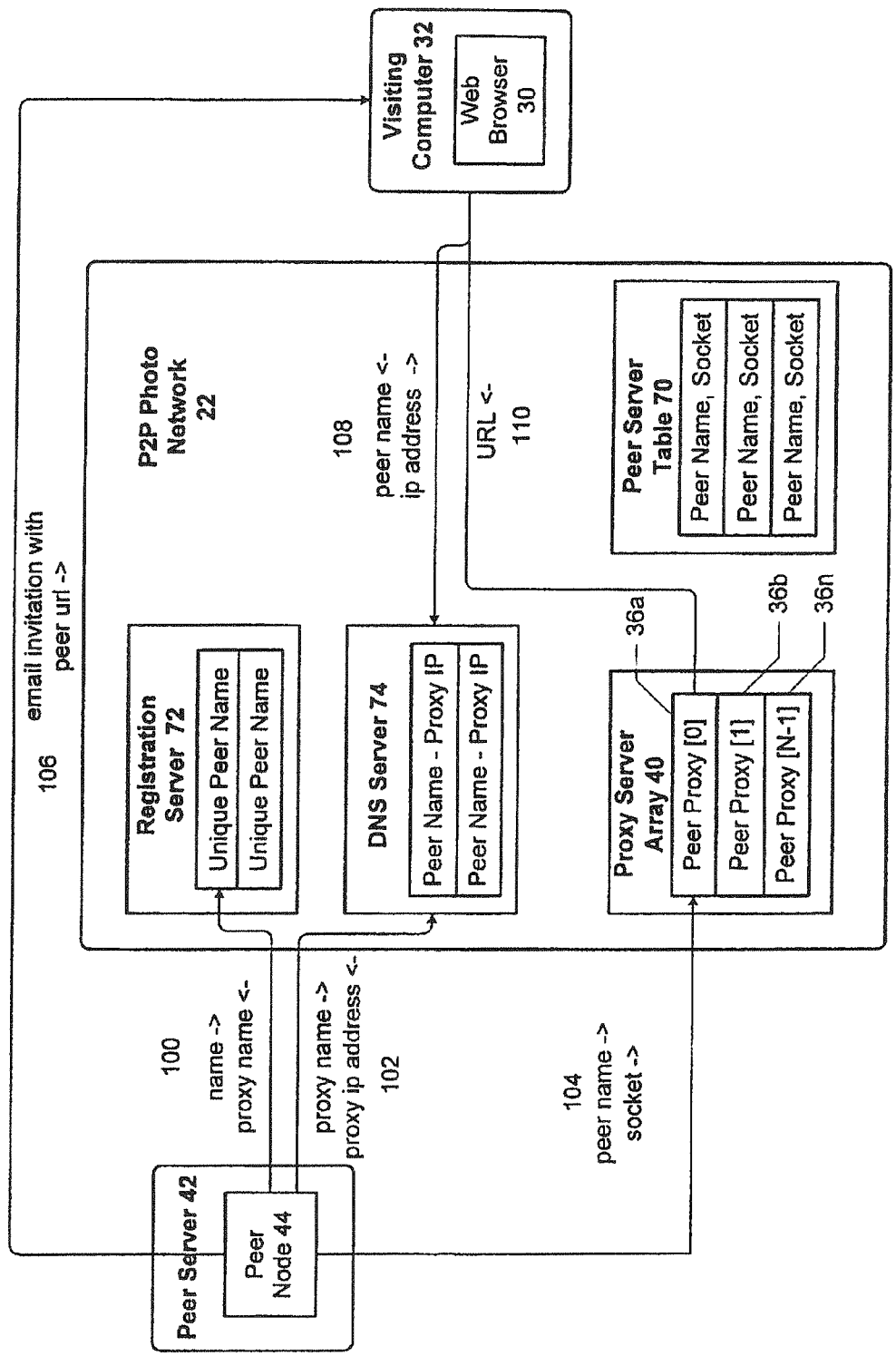
FIG. 7 is a flow diagram illustrating the process of a peer server registering with the photosharing peer-to-peer network to make its serving capabilities assessable through a firewall.

FIG. 7 is a flow diagram illustrating the process of a peer server 42 registering with the photosharing peer-to-peer network 22 to make its serving capabilities assessable through a firewall 34. In a preferred embodiment, the P2P network 22 includes several proxy servers 40*a-n*, referred to collectively as proxy server array 40, a peer server table 70, a registration server 72, and a DNS server 74.

The registration process begins in step 100, in which the peer node 44 passes its name to the registration server 72, the registration server 72 checks to make sure that the peer name is unique, and returns to the peer node 44 the name and IP address of the proxy server 40 to which it is assigned. In step 102, the peer node 44 registers its proxy server name and proxy server IP address with the DNS server 74. The DNS server 74 maintains a table of all peer names and their corresponding proxy IP addresses. In step 104, the peer node 44 registers the peer server's name and socket to proxy server 40 to which it was assigned.

In step 106, a user of the visiting computer 32 is notified that content (e.g., photos) exists on the peer server 42 for viewing. The notification could be implemented using several methods, but in a preferred embodiment, the user is notified via e-mail, with the e-mail including the URL of the content in the peer server 42. In step 108, the user of the visiting computer 32 receives the e-mail, and clicks on the URL. Using the peer name in the URL, the visiting computer 32 contacts the DNS server 74 to determine the identity of the proxy server 40 in which to send the request. The DNS server 74 responds with the IP address of the proxy server 40 assigned to the peer server 42. Given the proxy IP address, the web browser 30 of the visiting computer 32 sends an HTTP request to the proxy server 40 in step 110.

Figure 8:
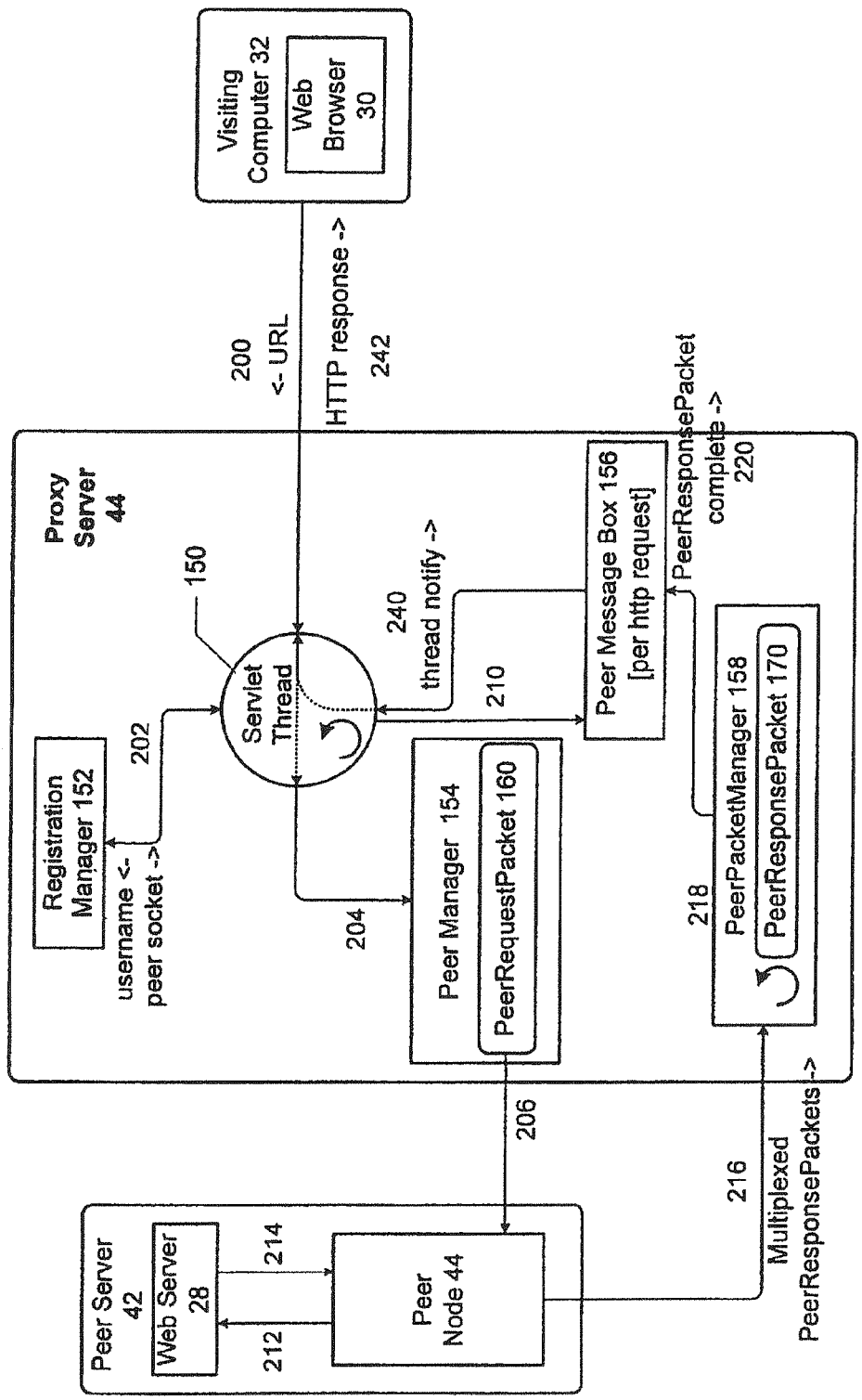
FIG. 8 is a diagram illustrating components of the proxy server and the flow between the requesting web browser, the proxy server, and the peer server to enable the web browser to have HTTP access to the peer server through the proxy server.

FIG. 8 is a diagram illustrating components of the proxy server 40 and the flow between the requesting web browser 30, the proxy server 40, and the peer server 42 to enable the web browser 30 to have HTTP access to the peer server 42 through the proxy server 40. In a preferred embodiment, the proxy server 40 includes multipleservlet threads 150, a registration manager 152, a peer manager 154, a peer MessageBox 156, and a peer packet manager thread 158.

The process begins in step 200 when the servlet thread 150 in the proxy server 40 receives the HTTP request in the form of a URL from the web browser 30. In step 202, the registration manager 152 checks the server table 70 (see FIG. 4) to determine if the peer server identified in the requesting URL is registered with the peer server 42, and if so, returns the corresponding peer socket. In step 204, the servlet thread 150 creates a peer request packet 160 from the HTTP request and then passes that packet to the peer manager 154.

Figures 9A, 9B:
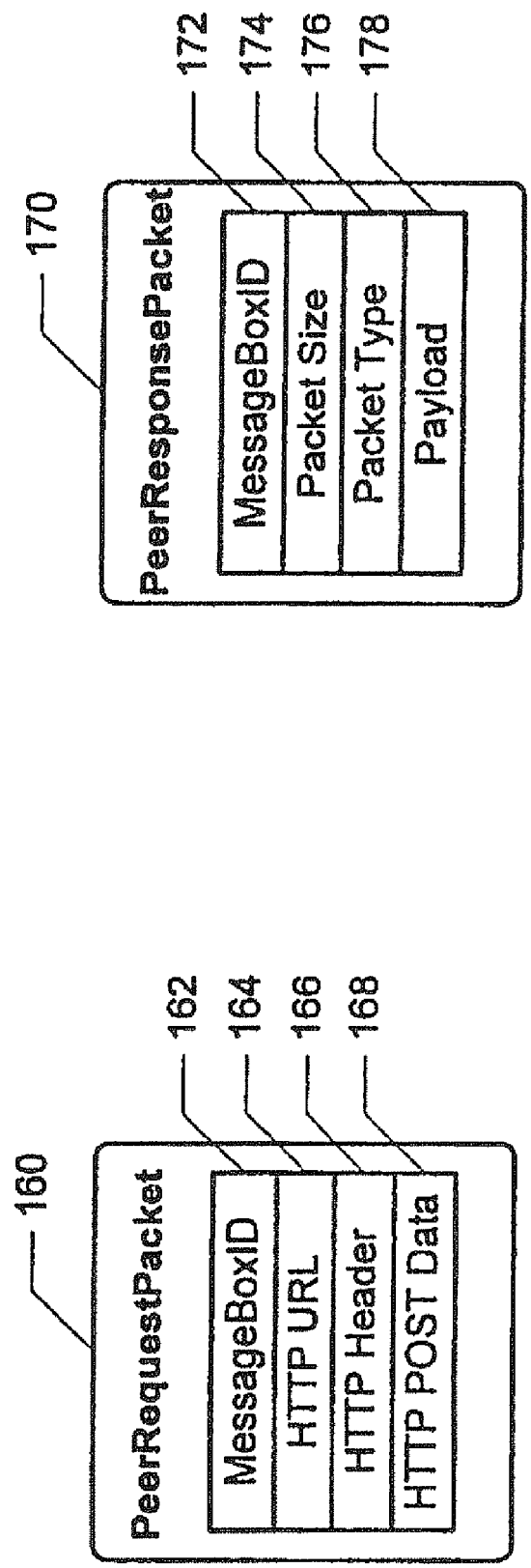
FIG. 9A is a diagram illustrating the contents of a peer request packet.
FIG. 9B is a diagram illustrating the contents of a peer response packet.

FIG. 9A is a diagram illustrating the contents of a peer request packet 160. In a preferred embodiment, the peer request packet 160 includes a MessageBoxID 162, an HTTP URL 164, multiple HTTP headers 166, and an HTTP Post Data field 168. The MessageBoxID 162 is a unique identifier for correlating peer request packets 162, peer response packets 170, and peer message boxes 156. The HTTP URL 164 is the URL that was requested from the visiting web browser 30. The HTTP Headers 166 is the HTTP headers from the original request from the visiting web browser 30. The HTTP Post Data field 168 contains data for when the request is a POST command, and not a GET command.

Referring again to FIG. 8, in step 206, the peer manager 154 finds the socket connection to the peer server 42 and passes the peer request packet 160 to peer server 42. In step 210, the servlet thread 150 gets a peer MessageBox 156 from the peer manager 154 and blocks, waiting for response packets to arrive in the peer MessageBox 156.

In step 212, the peer node 44 receives the request packet 160, converts the packet 160 back into an HTTP request, and sends the HTTP request to the web server 28. In step 214, an HTTP response is sent from the web server 28 to peer node 44, which then takes the HTTP headers from the response, creates a peer response packet 170, and sends it back to the proxy server 40. The remaining portion of the HTTP response is broken up into 2K chunks in step 216 and sent to the proxy server 40 in successive peer response packets 170. In a preferred embodiment, the peer node 44 inserts a routing address with each peer response packet 170. Note that there can be several threads handling request from the proxy server 40. Therefore, the peer node 44 multiplexes those responses over the same response socket back to the proxy server 40.

FIG. 9B is a diagram illustrating the contents of a peer response packet 170. In a preferred embodiment, the peer response packet 170 includes a MessageBoxID 172, a packet size 174, a packet type 176, and a payload field 178. The MessageBoxID 172 is a unique identifier for correlating peer request packets 162, peer response packets 170, and peer message boxes 156. The packet size 174 has to do with the fact that the response to the peer request packet 160 is sent back to the proxy server 40 in chunks. A packet size of 2K is used in the preferred embodiment. The individual packets are reassembled on the proxy server 40 to form the complete HTTP response, which is then returned to the visiting web browser 30. The packet type 176 indicates the type of data being returned in the payload field 178. Possible values include: [data, header, final packet]. The payload field 178 is the data portion of the peer response packet 170.

Referring again to FIG. 8, in step 218, the proxy server 40 receives raw bytes over the response socket and passes them to a peer packet manager 158 thread selected from a thread pool. In a preferred embodiment, there is only one peer packet manager thread per peer that is actively receiving requests 158 in the proxy server 40 170. In step 220, the peer packet manager thread 158 waits until there is a complete packet in its buffer, then routes the complete peer response packet 170 to the corresponding peer MessageBox 156. When the packet 170 arrives in the peer MessageBox 156, the corresponding servlet thread 150 wakes up and retrieves the complete peer response packet 170. In step 242, the servlet thread 150 converts the peer response packet 170 back into an HTTP response and then sends the HTTP response back to the requesting web browser 30. As disclosed herein, a combination of the proxy server 40 and the peer node 44 enable HTTP access to a peer server 42 located behind a firewall 34 by a visiting web browser 30.

In one embodiment, the present invention provides a peer server in a photosharing peer-to-peer network, where the peer server stores a web album and an associated digital image. In an embodiment, the present invention provides a computer readable medium having program instructions for, prior to the peer server going offline, synchronizing the peer server with a proxy server and a guest content server by copying a web page descriptor defining the web album from the peer server to the guest content server and copying an image associated with the web album from the peer server to the proxy server. In an embodiment, the computer readable medium also includes instructions for, in response to a request from a requesting computer to view content stored in the peer server when the peer server is off-line, fulfilling the request by forwarding the web album generated with the web page descriptor from the guest content server to the requesting computer via the proxy server, and forwarding the image associated with the web album from the proxy server to the requesting computer, thereby successfully serving content from the peer server even when the peer server is off-line.

The present invention has been described in accordance with the embodiments shown, and one of ordinary skill in the art will readily recognize that there could be variations to the embodiments. For example, while the preferred embodiment has been described in relation to a web-based peer-to-peer network, those skilled in the art would readily appreciate that the same principles can be applied to a conventional client-server environment where the client computer communicates directly with the peer server without utilizing the proxy server. Any variations would be within the spirit and scope of the present invention. Accordingly, many modifications may be made by one of ordinary skill in the art without departing from the spirit and scope of the appended claims.

What is claimed is:

1. A method of providing access to a peer server protected by a firewall, the method comprising:
   receiving from a requestor, at a proxy server, a URL request that identifies the peer server;
   accessing a server table having a plurality of peer names and socket information associated with each peer name of the plurality of peer names to determine if the peer server is registered with the proxy server;
   creating a peer request packet based on the URL request;
   passing the peer request packet to a peer manager associated with the proxy server where the peer manager finds a socket connection to the peer server;
   passing the peer request packet to the peer server;
   receiving a response at the proxy server including a peer response packet from the peer server, wherein the peer response packet includes:
   a packet size;
   a packet type;
   a payload field; and a unique identifier for correlating the peer request packet to the peer response packet;

converting the response into a URL request response at the proxy server;

caching data from the response at the proxy server; and sending the URL request response to the requestor.

2. The method of claim 1, wherein a servlet thread associated with the proxy server receives the URL request.

3. The method of claim 2, wherein the servlet thread creates the peer request packet and passes the peer request packet to the peer manager.

4. The method of claim 1, wherein the peer response packet received from the peer server is a chunk of a response such that the response includes a plurality of chunks represented by a plurality of peer response packets where the proxy server reassembles the plurality of chunks from the plurality of peer response packets during the conversion of the response to the URL request response.

\* \* \* \* \*